United States Patent [19]

Rando et al.

[11] Patent Number: 4,674,960
[45] Date of Patent: Jun. 23, 1987

[54] SEALED ROTARY COMPRESSOR

[75] Inventors: Joseph F. Rando, Los Altos Hills; Dale E. Koop, Sunnyvale, both of Calif.

[73] Assignee: Spectra-Physics, Inc., Calif.

[21] Appl. No.: 749,053

[22] Filed: Jun. 25, 1985

[51] Int. Cl.$^4$ ............................................. F04B 35/04
[52] U.S. Cl. ................................... 417/420; 418/104; 418/179; 418/206; 29/156.4 R
[58] Field of Search ....................... 418/104, 206, 179; 417/420; 29/156.4 R, 455

[56] References Cited

U.S. PATENT DOCUMENTS

| | | | |
|---|---|---|---|
| 2,940,661 | 6/1960 | Lorenz | 418/206 X |
| 3,059,396 | 10/1962 | Thees | 418/206 X |
| 3,238,883 | 3/1966 | Martin | 418/206 X |
| 3,287,909 | 11/1966 | Kell | 418/206 X |
| 4,111,614 | 9/1978 | Martin et al. | 418/206 X |
| 4,462,770 | 7/1984 | Haupt | 418/206 X |
| 4,465,442 | 8/1984 | Lang et al. | 418/206 X |

FOREIGN PATENT DOCUMENTS

| | | | |
|---|---|---|---|
| 1152575 | 8/1963 | Fed. Rep. of Germany | 418/206 |
| 57-20580 | 2/1982 | Japan | 418/206 |
| 17059 | 8/1893 | United Kingdom | 418/206 |

Primary Examiner—Carlton R. Croyle
Assistant Examiner—Theodore Olds
Attorney, Agent, or Firm—Paul Davis

[57] ABSTRACT

A sealed rotary compressor is provided which includes separate pump and gear chambers. Disposed within the pump chamber is a set of rotors operatively associated with a set of gears rotatably mounted within the gear chamber. A substantially pressure differential exists between the two chambers. Rotational power is applied directly to the rotors through a static seal rather than through the gears which are utilized primarily to transmit the dynamic load. The pump chamber is defined by two end plates with a surrounding thin-walled housing. Within the pump chamber are interior thin wall members with the rotary members disposed therebetween and defining inlet and outlet pockets operatively associated with a pump housing inlet and outlet means. The combination of pump and gear chambers are disposed within a separate pressure vessel whereby gas is introduced through the pressure vessel into the pump chamber and is expelled from the pump chamber into the interior of the pressure vessel from where it is expelled to a desired apparatus. The present invention is particulary suitable for applications with $CO_2$ axial-flow lasers.

8 Claims, 7 Drawing Figures

4,674,960

SEALED ROTARY COMPRESSOR

BACKGROUND OF THE INVENTION

This invention relates generally to rotary compressors, and more particularly, to a sealed rotary compressor housed in a separate pressure vessel which employs magnetic means to apply power to the rotors, and a substantially zero pressure differential is created across a separate gear housing from a rotor housing.

A rotary compressor such as a Root's blower (pump) is a multiple rotor positive displacement pump. Generally, a two-lobed blower is utilized wherein two rotors are rotatably mounted in a rotor housing and spin in opposite directions to trap gas therebetween and the outer walls of the housing. Trapped gas is moved from a low pressure port to a higher pressure port where it is displaced by the opposite rotor.

Conventional Root's blowers have suffered numerous limitations due to their high cost and tendency to introduce contaminants into the pumped gas.

In one design, the pumping chamber housing the rotors is separated from gears which are operatively associated with the rotors. These gears are housed in a distinct adjacent gear chamber. A rotor shaft supports a rotor and a gear in such a manner that the two are capable of rotational movement about the longitudinal axis of the shaft. Each shaft extends into the gear chamber, the pumping chamber, then to a powre source adapted to provide rotational movement of the shaft itself. As the shaft rotates, the rotor and gears are also caused to rotate. Disposed within the gear chamber is a lubricating solution such as oil which is provided to minimize damage to the gears due to wear.

A shaft seal is provided and disposed in an aperature of an end plate separating the two chamber. The shaft seal extends within the interior of the gear chamber and because there is a differential pressure between the two chamber, the seal must be a pressure seal. Should there be a failure in the pressure seal, the pressure differential causes lubricating fluid from the gear chamber to pass into the pumping chamber where contamination with the pumped gas (or pumped fluid) occurs. This pump also is disadvantageous because pumped gas has a tendency to leak.

The problems with a blower of this type are significantly magnified where the pump is utilized in a recirculating system such as found in laser applications. It is highly desirable for the pumped gas to have as little contamination as possible. When organic contaminants, such as those found in oil, are introduced into the gas and pumped into a laser system, deposits are formed on internal resonator surfaces and can greatly reduce the efficiency of the laser. Extensive clean-up may be required along with consequent maintenance.

Conventional Root's blowers not only have contamination problems because they are generally used for evacuation systems and often employ other systems such as traps to stop backstreaming. Leakage problems are also present in recirculating applications. These blowers have also required the use of a liquid lubricant in the gear chamber and a pressure differential is often created between the gear and pump housings. Numerous failures have been reported when lubricating material inadvertently enters the pumping chamber due to failed pressure seals.

Because this pressure differential exists, it has been necessary to have a shaft seal that is very tightly fit to the shaft. As the shaft rotates heat is generated and eventually the seal fails. Again the problem of contamination exists.

In many traditional Root's blowers there is pump chamber, and an evacuated chamber between the pump and gear chambers. A shaft extends through the various chambers requiring the employment of numerous shaft seals. Typically, dynamic seals are utilized and an oil bath is included. It is not unusual to have piston seals as part of the system. External pumping (another pump) is necessary to evacuate this intermediate chamber. With the employment of piston rings and seals which extend into the gear housing chamber, leakage occurs which ultimately results in contamination of the flowing gas.

Another disadvantage is the use of gears to transfer mechanical power between rotors in addition to a timing function. This prevents the use of lighter weight gears and/or lubricants and requires an oil bath. If the pump is in its own housing, a costly cast iron housing is necessary to prevent deformation under atmospheric pressure in order to limit the amount of back flow through the clearance gap.

There exists a need for an improved rotary compressor (Root's blower) which minimizes lubricating fluid contamination, and leakage of the pumped gas. Problems associated with conventional shaft seals (both internal and external) can create major problems with cleanliness and can be quite expensive. It would be highly desirable to have a compressor that did not have a intermediate chamber disposed between the gear chamber and the pumping chamber which requird a pumping down of the intermediate chamber. Additionally, it would be desirable to provide a compressor made of low cost materials, having compact design, and which would not require the gears to transfer mechanical power between the rotors. Inherent in this concept would be the ability to employ low cost pump chamber housing materials.

SUMMARY OF THE INVENTION

Accordingly, it is an object of the invention to provide an improved sealed rotary compressor which overcomes the problems and difficulties of conventional Root's blower systems.

Another object of the invention is to provide a sealed rotary compressor which substantially eliminates any pressure differential between the gear and pumping chambers.

Still another object of the invention is to provide a sealed rotary compressor which does not require liquid lubrication in the gear housing.

Another object of the invention is to provide a sealed rotary compressor which has a separate pumping chamber and a distinct pressure vessel, wherein the pumping chamber is actually housed within the pressure vessel and gas flow from the pumping chamber is directed to the interior of the pressure vessel.

Yet a further object of the invention is to provide an improved sealed rotary compressor which employs relatively inexpensive materials to house the rotors.

Still a further object of the invention is to provide a sealed rotary compressor which does not include an intermediate chamber to separate the gear and pump chambers.

Another object of the present invention is to provide a sealed rotary compressor which applies power directly to the rotors and the associated gears are employed primarily to maintain the synchronization of the rotors.

Still another object of the present invention is to provide a sealed rotary compressor which includes gears made of materials adapted to eliminate the use of a liquid lubricant material within the gear chamber.

Another object of the present invention is to provide a sealed rotary compressor which includes an dynamic shaft seals.

Yet another object of the present invention is to provide a sealed rotary compressor useful for pumping a gas in a clean recirculating system.

Yet another object of the present invention is to provide a sealed rotary compressor adapted for use in a laser and minimize the occurence of contaminated gas.

Still a further object of the present invention is to provide a method of pumping a gas utilized in an axial-flow laser substantially free of contaminants and gas loss is minimized.

To achieve these objects as well as others, a sealed rotary compressor is provided which comprises an enclosed pump chamber defined by first and second opposing end plates, a thin surrounding enclosing wall member disposed therebetween and inlet and outlet means for receiving and dispelling a gas to and from the pump chamber. Positioned in adjacent contacting relationship to the pump chamber is an enclosed gear chamber which is defined by wall members and the second opposing end plate of the housing chamber. The pumping chamber houses rotor members which are rotatably supported therein, and the gear chamber houses gear members which are also rotatably supported therein and operatively associated with the rotor members. The housing and gear chambers are separated by the second end plate and there is a substantially zero pressure differential across the two housings. Power means are operatively associated with the rotor members to provide substantially direct power to the rotor members through a static seal causing rotational movement of the rotors and gear members and pumping of a gas entering through the inlet means, passing through the pump chamber and exiting through the outlet means.

In another aspect of the present invention, a sealed rotary compressor is provided which includes an enclosed pump chamber defined by first and second opposing end plates, a thin enclosing wall member enclosing an area between the opposing plates, inlet means for admitting gas to the pump chamber and outlet means for expelling gas therefrom. Rotor means are rotatably supported in the pump chamber and adapted to introduce and expel gas to and from the chamber. A gear housing is defined by wall members and the second end plate of the pump chamber. The gear housing is in adjacent contacting relationship to the second end plate and a substantially zero pressure differential is established across the second end plate between the pump and gear housings. Gear members are operatively associated with the rotors and rotatably supported in the gear chamber. Power means operatively associated with the rotor and gear members are adapted to provide a substantially direct rotational power imparted to the rotor members through a static seal. Wall members defining a pressure vessel enclose the pump and gear chambers. The pump chamber inlet means receives gas from the exterior of the pressure vessel and it is expelled through the outlet means into the pressure vessel or can be circulated entirely within the pressure vessel.

In yet a further aspect of the present invention, a method provides for the pumping of a gas with minimal introduction of contaminants into a gas. The method includes providing a rotary compressor comprising an enclosed pump chamber housing rotatably supported rotor members, and an enclosed gear chamber housing gear members operatively associated with the rotor members. The housings are separated by an end plate adapted to provide a substantially zero pressure differential therebetween. Means are included for powering the rotor members, and a sealed pressure vessel houses the pump and gear chambers. The rotor members and gear members are rotated causing an introduction of a gas through an inlet into the interior of the pump chamber passing it through the chamber and then expelling it through an outlet into the interior of the pressure vessel and into a desired apparatus substantially free of contaminants.

Numerous advantages are derived by the novel rotary compressor of the present invention. Contamination problems typically associated with traditional Root's blowers are minimized by eliminating the pressure differential between the gear and housing chambers. Two end plates and a thin wall member define the housing chamber for the rotors, eliminating high costs associated with heavier parts such as those made of stronger materials which have previously been necessary. The rotors can be directly powered and power is not applied through the gear members. The gears are included primarily to provide synchronization.

When a pressure differential exists between the gear and housing chambers, a tight shaft seal is necessary. With conventional Root's blowers, this shaft seal has extended from the end plate separating the two chambers into the gear chamber. The present invention eliminates the tight shaft seal requirements; and in fact, the seal itself does not extend externally into either chamber.

In one embodiment of the invention, dynamic shaft seals are used for wet lubrication applications. In another embodiment, there is no oil bath in the gear chamber. Bearings employed use a dry lubricant or are sealed bearings with a high vacuum grease. In one embodiment, the gears can be coated with a dry lubricant or composite gears impregnated with a dry lubricant. One of the materials employed is composite polyurethane impregnated with either $MoS_2$ or graphite.

Employment of a separate pressure vessel apart from the pump chamber allows for multiple purpose uses of the pressure vessel. For example, heat exchangers, catalysts and filters can also be included within the pressure vessel for any number of purposes. By coupling mechanical power through magnetically coupled power apparatus through a sealed window, contamination is decreased. The apparatus is low cost in one embodiment due to the pump chamber housing. It can be formed of sheetmetal and this housing is in turn enclosed in the outer pressure vessel which may be a gas pipe, or structural tubing and the like. Rotors may or may not be laminated.

The present invention is particularly suitable for use with high-power gas lasers. By minimizing the level of contamination which a traditional Root's blower introduces, the present invention provides a much cleaner gas stream adaptable for use in a gas laser such as a $CO_2$ laser. By elimination of the contamination, there is less build-up of contaminants on the critical internal parts of the laser resonator. Because the present invention provides for the pump and gear chambers to be disposed within a pressure vessel, leakage does not pose a problem. Essentially, any gas leak from the pump housing jsut flows into the interior of the pressure vessel. Again, this is where the gas is expelled from the pump chamber itself.

The present invention finds particular utility as a useful auxiliary apparatus associated with a high-power gas laser such as a $CO_2$ laser. More particularly, it is very desirable to use the present invention in combination with a $CO_2$ axial flow laser. The present invention is suitable for such use in that the consumption of laser gas is kept to a minimum due to the combination of a separate pump chamber which is housed in a distinct pressure vessel and allowing gas to exit from the pump chamber directly into the pressure vessel from which the gas then flows into the laser resonator.

DETAILED DESCRIPTION OF THE DRAWINGS

DESCRIPTION OF PREFERRED EMBODIMENTS

A sealed rotary compressor is disclosed which has an enclosed pump chamber defined by first and second opposing end plates and a thin enclosing wall member disposed therebetween, with inlet and outlet means included for allowing the admission and expulsion of gas in the pump chamber. An enclosed gear housing is positioned in adjacent contacting relationship to the pump chamber and is defined by wall members and the second opposing end plate of the pump chamber. This second opposing end plate is adapted to provide minimal or a zero pressure differential across the two chambers. Rotor members are rotatably supported in the pump chamber and gear members are also rotatably supported in their respective gear chamber. The gear members and rotor members are operatively associated with one another to provide for rotational movement and the pumping action of the sealed rotary compressor. Power means are operatively associated with the rotor members to provide substantially direct power to at least one of the rotor members through a static seal which causes rotational movement of the rotor and gear members.

The gear and pump housings are disposed and supported within a pressure vessel. Gas enters the inlet of the pump chamber and is expelled directly into the pressure vessel which is operatively associatd with any number of desired apparatus, or the gas can be circulated entirely within the pressure vessel. In one embodiment, the pressure vessel is operatively associated with a $CO_2$ axial flow laser.

Figure 1:
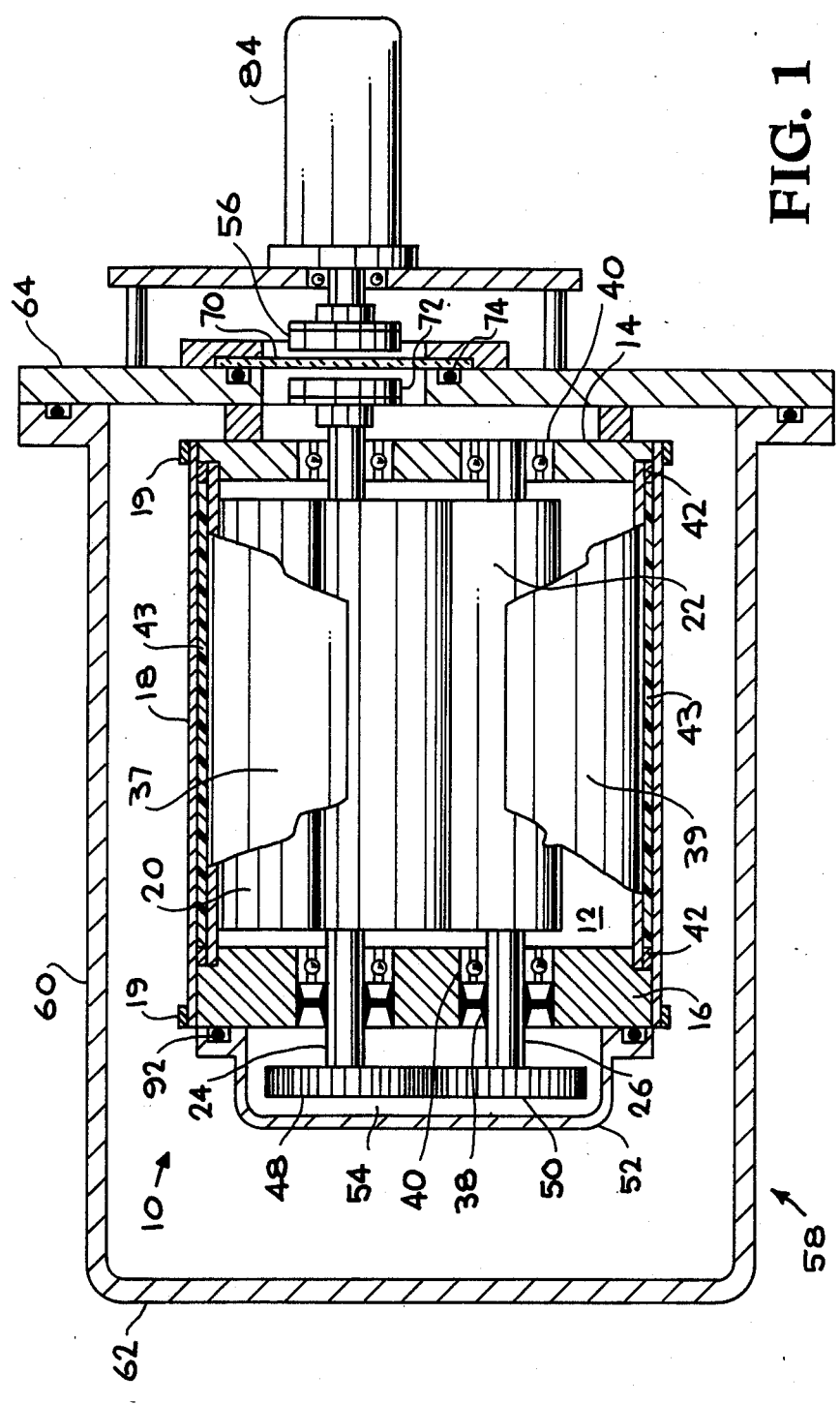
FIG. 1 is a side sectional view of one embodiment of the rotary compressor defined by the present invention.

With reference now to FIGS. 1 through 8, particularly FIG. 1, there is illustrated a sealed rotary compressor denoted generally as 10 including a pump chamber 12 defined by first and second end plates 14 and 16, respectively, and a thin wall member 18 disposed between first and second end plates 14 and 16, creating an enclosed sealed pump chamber 12.

Means are provided to engage wall member 18 in a tightly fitting surrounding relationship with end plates 14 and 16. Such means can be anything to affect the engaging relationship but due to the elegant design of pump chamber 12 low cost materials may be employed. Exemplary engaging means include but are not limited to a plurality of band clamps 19 disposed in a surrounding adjacent relationship along the exterior of wall member 18.

Significantly, wall member 18 is comprised of a thin material. Thin materials include but are not limited to various sheet metals. In one embodiment of the invention, stainless steel having a thickness of about 0.03" is employed. Other thin sheet metal materials are also suitable including aluminum and the like.

Figure 3:
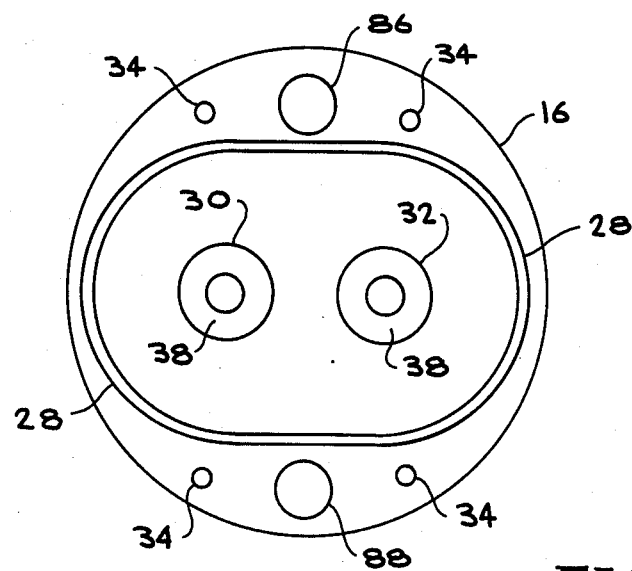
FIG. 3 is a plan view of one of the end plates of the rotary compressor illustrated in FIGS. 1 and 2.
Figure 4:
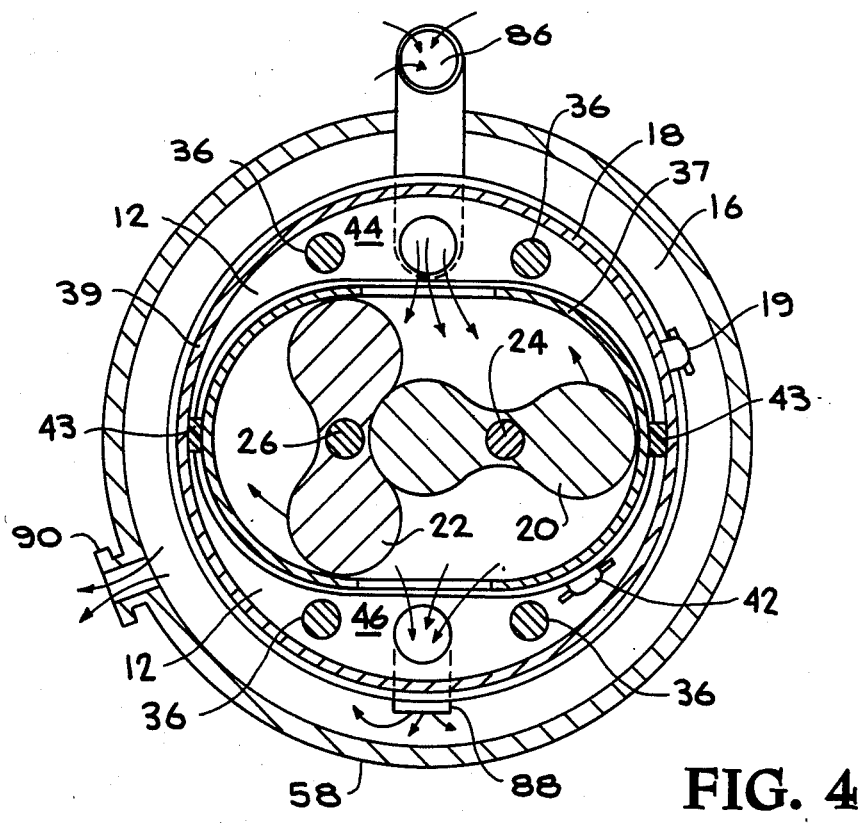
FIG. 4 is a sectional view of the interior of the pump housing and pressure vessel of the rotary compressor.

As illustrated in FIGS. 3 and 4, the interior surface of end plates 14 and 16 shows each having a generally circular geometric configuration. Disposed within each surface is a groove 28 which has an oval configuration. Groove 28 can be formed by various well known conventional techniques such as milling. The configuration of end plates 14 and 16 (and their respective interior surfaces) can be considered to constitute jig-plates.

Figure 5:
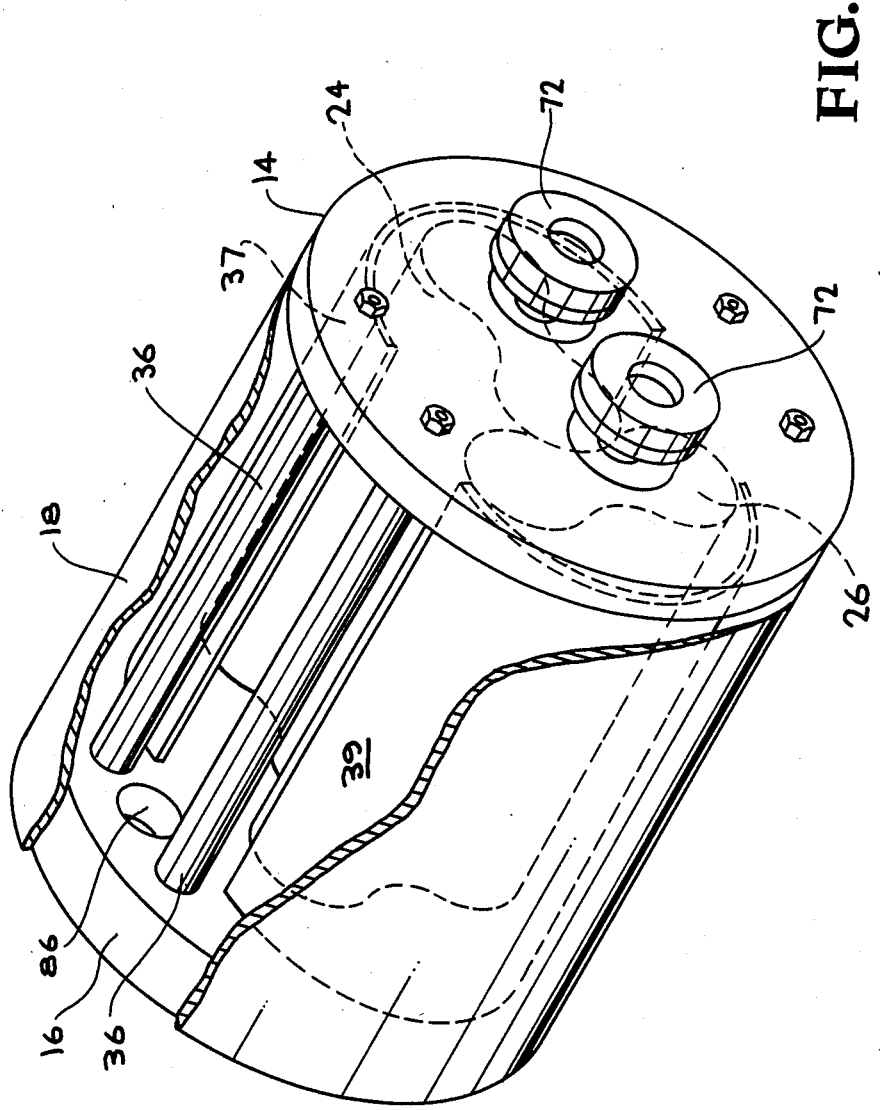
FIG. 5 is a perspective view of a pump housing of the rotary compressor with portions broken away.

End plates 14 and 16 can be formed of any suitable material and in one embodiment comprise one-half inch aluminum. Each one has a plurality of apertures formed therein. Two apertures 30 and 32 are adapted to receive shafts 24 and 26, respectively. Four remaining apertures 34 are adapted to hold a spacer element 36 by threadably engaging it with each of the end plates 14 and 16 to rigidly space and support the two a predetermined distance apart. Spacers 36 are illustrated in FIG. 5.

A plurality of shaped thin wall members 37 and 39 are included in the interior of pump chamber 12 and have a generally half-cylindrical geometric configuration. Wall members 37 and 39 are formed typically of sheet metal and are capable of being shaped to a preselected geometric configuration. Exemplary materials include 16/1000 brass and the like. Wall members 37 and 39 are received in grooves 28 in each respective end plate 14 and 16. Means are provided for receiving wall members 37 and 39 within grooves 28, however, they are maintained in a spaced-apart relationship to permit the entrance and exit of gas. As shown in FIG. 4, rotors 20 and 22 are positioned within pump chamber 12 between wall members 37 and 39. Wall members 37 and 39 are maintained in a stationary position by attachment members including but not limited to a plurality of band clamps 42.

The oval geometric configuration of grooves 28 provides a point within pump chamber 12 where wall members 37 and 39 are in very close proximity (almost to a point of actual sealing contact) with wall member 18. Two seal members 43 are provided along the longitudinal interior of wall member 18 to divide the interior of pump chamber 12 into an inlet pocket 44 and for receiving gas an outlet pocket 46 for expelling it.

Housed within pump chamber 12 are two rotors 20 and 22, rotatably supported therein by longitudinal shafts 24 and 26, respectively.

Disposed within apertures 30 and 32 of end plate 16 are dynamic shaft seals 38 (shown in FIGS. 1 and 2) which do not extend within the interior of chamber 12 or 54, and a set of sealed bearings 40 which also do not extend within the interior of either chamber. Exemplary shaft seals 38 include but are not limited to double-lip shaft seals and the like. Exemplary bearings are either dry-lubricated or can be sealed bearings with a high vacuum quality grease. A pair of bearings 40 is also disposed in the apertures formed in end plate 14. Positioned at one end of each shaft 24 and 26 are gear members 48 and 50.

Gears 48 and 50 are supported by shafts 24 and 26, respectively, and are capable of rotational movement about the longitudinal axis of the shafts as previously disclosed with respect to rotors 20 and 22. Wall members 52 along with second end plate 16 enclose and define a gear chamber 54. The positions of seals 38 and bearings 40 can be switched so that they reside in gear chamber 54. This scheme can exist at either end plate 14 or 16.

Figure 2:
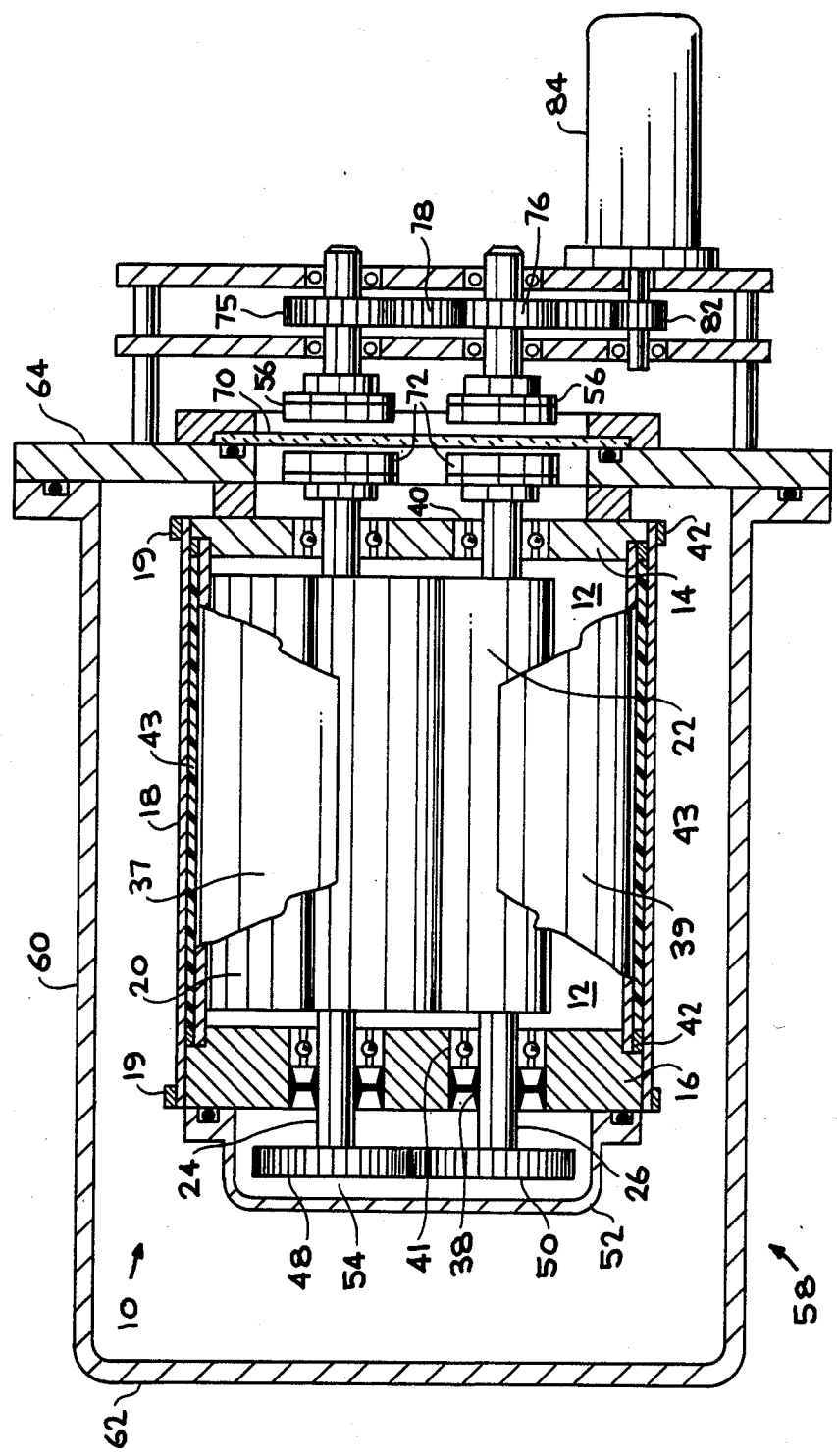
FIG. 2 is a side sectional view of a second embodiment of the rotary compressor defined by the present invention illustrating a rotary compressor with a double magnetic power system.

In the embodiment of the present invention illustrated in FIG. 1, shaft 24 extends through end plate 14 and engages a pump magnet 56. As shown in FIG. 2, a second embodiment illustrates how shafts 24 and 26 each extend beyond end plate 14 and respectively engage a pump magnet 56.

The entire assembly thus disclosed (pump chamber 12, gear chamber 54 as well as pump magnets 56) is mounted within a pressure vessel 58 which is defined by an end plate 60 and a thick-walled member 64 which in total combination provide a hermetically sealed environment. End plate 60 is sealed by conventional means to create a sealed vessel and can be threadably engaged with thick-walled member 64. Pressure vessel 58 can be formed of substantially hard, gas impermeable materials including metals, glass, ceramics, plastics and the like.

Figure 7:
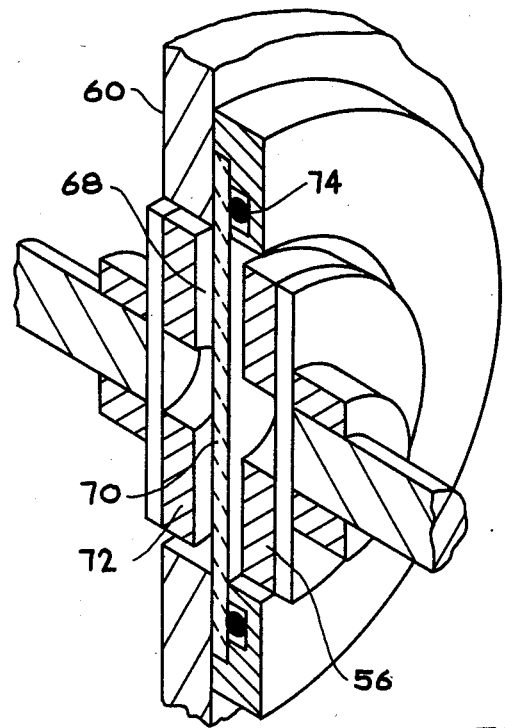
FIG. 7 is a perspective view of the double magnetic drive system employed in the embodiment illustrated in FIG. 2.

With reference now more specifically to FIG. 7, there is disclosed an aperture 68 formed in end plate 60 and a window 70 sealably engaged with end plate 60. Window 70 is adapted to enable magnetic coupling (by the creation of a magnetic flux) between pump magnet(s) 56 with drive magnet(s) 72 while also sealing vessel 58. Suitble window materials must have low electrical conductivity, high strength and include but are not limited to alumina, stainless steel, quartz, fiberglass, ceramics and the like. Window 70 is hermetically sealed to end plate 60 and disposed between the two is a retained O-ring 74.

Magnets 56 and 72 are in one embodiment of the invention eight-pole ceramic magnets. They can be made of alnico alloys, rare earth materials and the like. When the double magnetic drive system is employed, magnets 72 are mounted via a shaft member or the like to gears 74 and 76, respectively, which are engaged by a double-sided timing belt 78 and idler 80, a drive gear 82 which in turn is operatively associated with a motor 84 (see FIG. 6 for the details of the gear configuration). The double magnetic drive system minimizes gear loading and allows for easier operation by employing dry film lubricants and/or composite gears.

Figure 6:
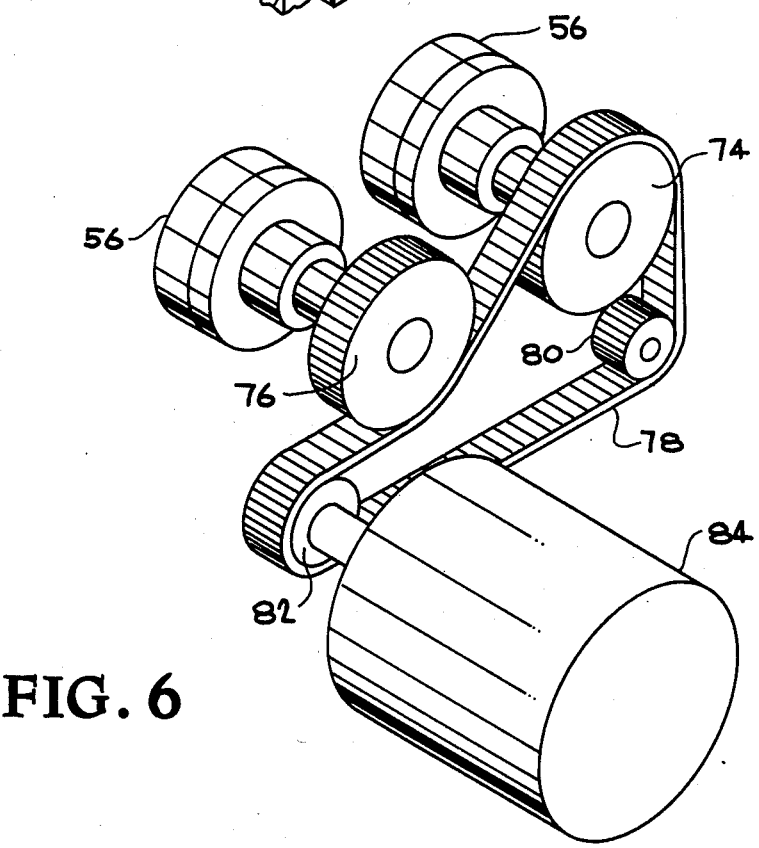
FIG. 6 is a partially cut away perspective view illustrating the relationship of the magnets, window and pressure vessel.

With specific reference now to FIG. 1, there is illustrated an embodiment of the present invention wherein only one pump magnet 56 and a drive magnet 72 are operatively associated with motor 84, eliminating the gears and timing belt configuration illustrated in FIG. 6.

Referring to FIG. 4 specifically, there is illustrated an inlet 86 and an outlet 88 for admitting and expelling a gas to and from pump chamber 12.

Gas is expelled from outlet 88 and enters into the interior of pressure vessel 58. From there, the gas can be removed through a pressure vessel outlet 90 utilized for a number of purposes and also can be recirculated within vessel 58. FIG. 4 illustrates the entrance and exit of the gas in pump chamber 12. As shown, a gas enters through inlet 86 into inlet pocket 44. Due to the rotational movement of rotors 20 and 22, (with the rotors spinning in opposite directions as in conventional lobed and gear pumps) gas is trapped between the rotors and wall members 37 and 39. The trapped gas is then moved from inlet pocket 44 to a higher pressure outlet pocket 46 where it is displaced by the opposite rotor and then flows out through outlet port 88.

Rotors 20 and 22 can be formed from one integral piece or can be any number of different members which are aligned and the ends countersunk with bolts to retain them together, and in one embodiment the rotors are made of laminated plates of sheet metal which are stacked and retained as one piece by bonding, welding, etc. as in conventional electrical motor transformers. The rotational direction of rotors 20 and 22 can be reversed so that the outlet 88 is now an inlet and inlet 86 becomes the outlet.

Shafts 24 and 26 engage rotors 20 and 22 so that they are secured to the shafts and capable of rotational movement as each of the shafts rotates about its longitudinal axis and extend through end plates 14 and 16, respectively. Within end plate 16, shafts 24 and 26 are engaged with bearings and dynamic shaft seals 40 and 38, respectively, and provide an efficient seal between gear chamber 54 and pump chamber 12. Because there is substantially no pressure differential between the two chambers, contaminants do not carry across from one chamber to the next. Thus, even if a lubricating fluid such as oil and the like is housed within gear chamber 54, the lubricant does not enter into pump chamber 12 because of the lack of a pressure differential across shaft seals 38 and additionally due to the fact that high vacuum quality oils can be employed. Each end of a shaft 24 and 26 has a simple taper bore configuration adapted to engage gears 48 and 50, respectively, which provides a locking mechanism. Other conventional locking mechanisms can be employed such as collars, clamps, set screws and pins.

In one embodiment of the invention, gears 48 and 50 are helical gears and can be coated with dry lubricant or can be composite impregnated with a dry lubricant such as $MoS_2$ graphite. An O-ring 92 is included to provide a sealed engagement between wall members 52 and end plate 16.

The use or non-use of a dry or a wet lubricating medium within gear housing 54 is determined by many factors such as the load transferred between the gears and required lifetime of the lubricating medium. The ability to use magnets to apply power to one or both rotors allows one to minimize the load on the gears. Gears 48 and 50 provide synchronization. In one embodiment, the gears are comprised of a steel material and are dry-lubricated. A composite such as polyurethane impregnated on steel with a dry lubricant may also be employed. Gears 48 and 50 transmit the dynamic load and provide the timing function, thus they are essentially floating. The average transmitted power is substantially zero and the average load on the gears is minimal.

The present invention finds application to $CO_2$ lasers, and more particularly to $CO_2$ axial flow lasers. Use of a traditional roots blower in combination with a $CO_2$ axial flow laser creates a pressure differential between the gear chamber and the pump chamber. The laser runs at low pressure (approximately 0.1 atmosphere), there exists a 0.9 atmosphere pressure which is transmitted across the shaft. In such uses, when lubrication has been employed within the gear chamber and upon a failure of a shaft seal, the pressure differential causes a flow of lubricating medium from the gear chamber into the pumping chamber where it is then transmitted to the laser resonator itself. The shaft seals commonly employed in such applications have been piston ring seals or labyrinth which have had a tendency to fail. Additionally, there is a concern about loss of laser gas due to the blower design.

These disadvantages are not found with the implementation of the sealed rotary compressor of the present invention. In one embodiment substantially all parts of the present invention are of a high vacuum quality nature.

While preferred embodiments of the invention have been illustrated and described and therefore the invention should not be limited to the precise details set forth, but should be availed to such changes and alterations as may fall within the purview of the following claims.

We claim:

1. A sealed rotary compressor for circulating and recirculating gas through a laser, comprising:
   an enclosed pump chamber including inlet and outlet means and defined by first and second end plates and a surrounding sheet metal wall member disposed therebetween, inner and outer sheet metal pocket wall members, each of said end plates having a groove formed in a pump chamber interior surface adapted to receive and retain said sheet metal pocket wall members defining inlet and outlet means;
   rotor members rotatably supported in said pump chamber and disposed between said pocket wall members;
   an enclosed gear housing defined by said second end plate and enclosing wall members, adapted to provide a substantially zero-pressure differential between said pump chamber and said gear chamber;
   gear members rotatably supported in said gear housing and operatively associated with said rotor members, said gear members providing synchronized movement of said rotor members;
   means for rigidly spacing and supporting said end plates and preventing rotational movement of said sheet metal pocket wall members;
   a plurality of dynamic shaft seals and sealed bearings disposed in apertures formed in said second end plate, said seals and bearings providing a substantially zero-pressure differential between said pump and gear chambers and adapted to receive shaft members operatively associated with said rotor members; and
   power means operatively associated with said rotor members, said power means including a static seal through which power is applied to said rotor members.

2. The sealed rotary compressor according to claim 1, further including a shaft member operatively associated with each of said rotor members adapted to fixably support a rotor and gear member in said pumping and gear chambers, respectively, while permitting rotational movement of said members about a shaft longitudinal axis.

3. The sealed rotary compressor according to claim 2, wherein said sealed bearings are high-vacuum greased.

4. The sealed rotary compressor according to claim 2, wherein said bearings are dry lubricated.

5. A sealed rotary compressor for circulating and recirculating gas through a laser, comprising:
   an enclosed pump chamber including first and second opposing end plates, a surrounding sheet metal wall member enclosing and sealing an area between said opposing end plates, inner and outer sheet metal pocket wall members, inlet means for admitting gas to said pump chamber and outlet means for expelling gas therefrom, each of said end plates having a groove formed in a pump chamber interior surface adapted to receive and retain said sheet metal pocket wall members defining inlet and outlet pockets operatively associated with said inlet and outlet means;
   rotor members rotatably supported in said chamber and disposed between said pocket wall members;
   a gear chamber defined by wall members and said second end plate, said gear chamber being in adjacent relationship to said second end plate with a substantially zero-pressure differential established across said second end plate between said pump and gear chambers;
   gear members rotatably supported in said gear housing and operatively associated with said rotor members, said gear members providing synchronized movement of said rotor members;
   means for rigidly spacing and supporting said end plates and preventing rotational movement of said sheet metal pocket wall members;
   a plurality of dynamic shaft seals and sealed bearings disposed in apertures formed in said second end plate, said seals and bearings providing a substantially zero-pressure differential between said pump and gear chambers and adapted to receive shaft members operatively associated with said rotor members;
   power means operatively associated with said rotor and gear members, said power means including a static seal through which power is applied to said rotor members; and
   a pressure vessel which houses said pump and gear chambers, wherein said pump chamber inlet means receives gas from an exterior of said pressure vessel through a pressure vessel inlet and expels gas through said pump chamber outlet means into an interior of said pressure vessel, said pressure vessel including an outlet means for dispelling gas from within said pressure vessel interior or circulated entirely therein.

6. The sealed rotary compressor according to claim 5, further including a pair of shaft members adapted to fixably support a rotor and a gear member in said pump and gear chambers, respectively, and provide rotational movement about a shaft member longitudinal axis.

7. The sealed rotary compressor according to claim 6, wherein said bearings are lubricated with high-vacuum grease or oil.

8. The sealed rotary compressor according to claim 6, wherein said bearings are dry lubricated.

* * * * *